UNITED STATES PATENT OFFICE.

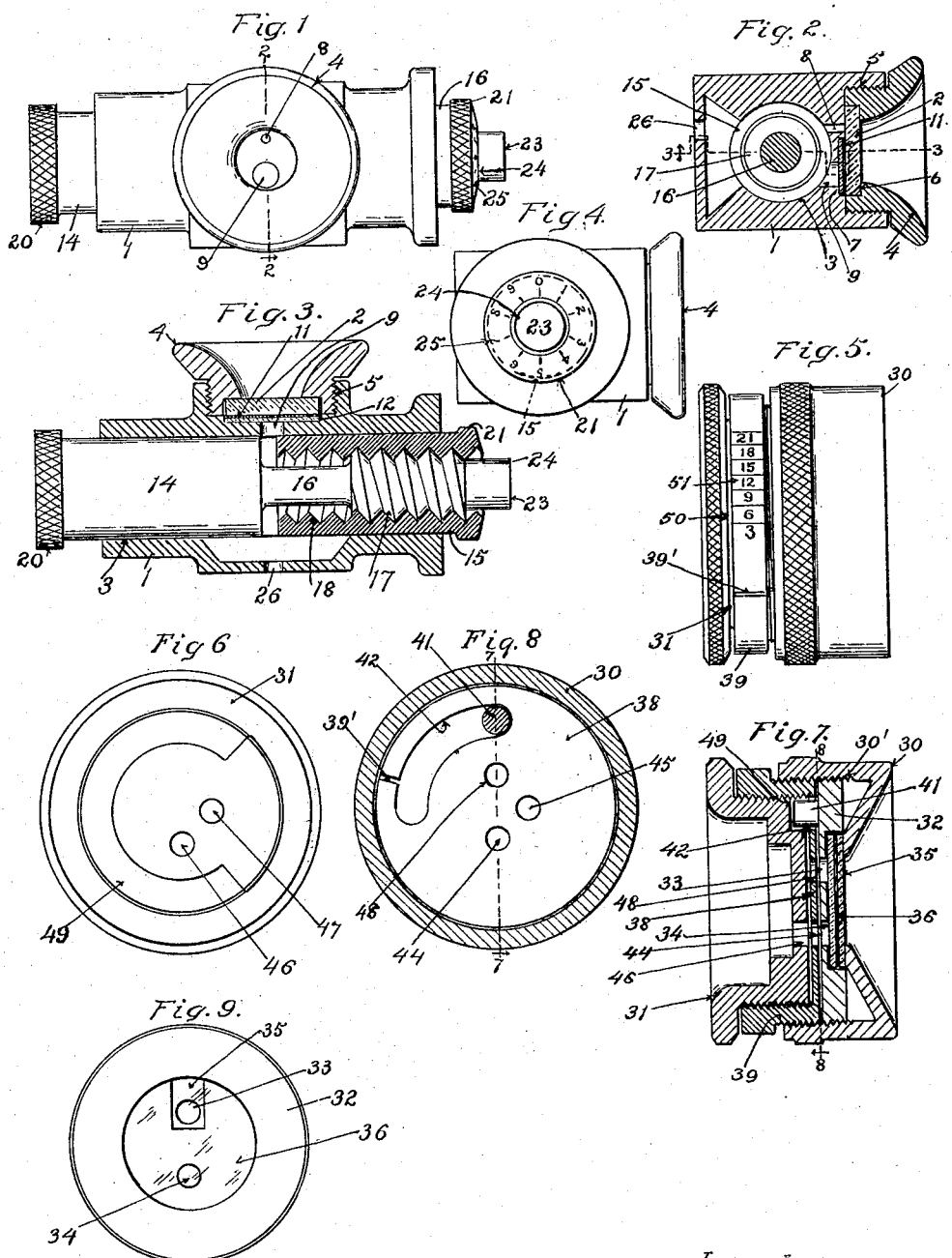

ALFRED C. STEWART, OF LOS ANGELES, CALIFORNIA.

ACTINOMETER.

1,211,781.   Specification of Letters Patent.   Patented Jan. 9, 1917.

Application filed February 14, 1916.  Serial No. 78,240.

*To all whom it may concern:*

Be it known that I, ALFRED C. STEWART, a citizen of the United States, residing at Los Angeles, in the county of Los Angeles and State of California, have invented a new and useful Actinometer, of which the following is a specification.

This invention is an improvement on the type of actinometer or exposure meter disclosed in my application Ser. No. 20,067, filed Apr. 2, 1915, in which provision is made for observation of a surface illuminated by light from an object which is to be photographed, and for regulating the amount of light so received to enable the intensity of the light to be indicated, and further provision is made for temporarily shutting off the light to enable comparison of the illumination to be made with a condition of comparative darkness, whereby a more accurate reading may be secured.

One object of the present invention is to provide for observation of the illuminated surface by transmitted light, whereby certain advantages in construction and operation may be attained.

Another object of the invention is to provide for regulation of the light by a different movement from that which effects the temporary shutting off of the light, whereby the regulating and darkening operations may be effected more easily and quickly.

Other objects and advantages of the invention will appear hereinafter. The accompanying drawings illustrate embodiments of the invention, and referring thereto:

Figure 1 is a front elevation of one form of the invention. Fig. 2 is a transverse section on line 2—2 in Fig. 1. Fig. 3 is a longitudinal section on line 3—3 in Fig. 2. Fig. 4 is an end view of the device shown in Fig. 1. Fig. 5 is a side elevation of another embodiment of the invention. Fig. 6 is a front elevation of the objective member for the form shown in Fig. 5. Fig. 7 is a longitudinal section, on line 7—7 in Fig. 8, of the form of the invention shown in Fig. 5. Fig. 8 is a section on line 8—8 in Fig. 7. Fig. 9 is a front elevation of a fixed diaphragm member for the eye-piece in the form shown in Fig. 5.

Referring to Figs. 1 to 4, the form of the invention therein shown comprises an outer member 1, provided with an eye-piece and objective aperture means, and an inner member, mounted to slide in a bore 3 in member 1, and provided with regulable means for intercepting the light. The eye-piece 4 may be formed as a funnel shaped member screwing in a socket 5 on member 1, and the members 4 and 1 are provided with shoulders 6 and 7 between which is clamped a color screen 2, consisting, for example, of blue glass, adapted to transmit only the actinic rays from the object to be viewed. At the inner side of this color screen, member 1 is provided with openings 8 and 9, opening into the bore 3; a translucent light diffusing screen 11, consisting for example, of a gelatin film, being mounted back of color screen 2, and in front of passage 9, said film being supported by a glass plate 12.

The light intercepting member consists of two parts 14 and 15, both formed as cylindrical members adapted to slide in bore 3 of member 1, the part 14 being provided with a neck portion 16 extending axially in the bore 3 and having a screw threaded enlargement at its outer end, screwing in an internally screw threaded hole 18 in part 15. Parts 14 and 15 may have knurled collar portions whereby they are adapted to be operated both in rotation and in reciprocation within member 1, and the part 14 has a longitudinal extension 23 which projects through and beyond part 15, so that an index 24 on said extension may be read with reference to a scale 25 on the outer end of part 15, to indicate the size of the light admitting opening between the parts 14 and 15.

A light receiving or objective aperture 26 is provided in member 1, opposite the eye-piece, and is preferably of such size and so positioned that no light can pass directly from said aperture to the opening 9 for the eye-piece, on account of the interposition of the neck 16 of part 14, between the aperture 26 and opening 9. Opening 8 is, however, positioned to receive light directly from aperture 26, so that the object may be viewed directly through opening 8.

The device is used as follows: The instrument is held with the aperture 26 directed toward the object or scene to be photographed, and if no light appears at the eye-piece, the part 15 is turned relatively to the part 14, so as to enlarge the opening between such parts, until light begins to appear at the opening 9 of the eye-piece; or, preferably, the parts 14 and 15 are first separated far enough to permit a distinct light to appear at the eye-piece, and are then gradually screwed together so as to eventually cause the light to disappear. The appearance of light at the opening 9 of the eye-piece is due to illumination of the translucent screen 11, by light passing through aperture 26 and diffusively reflected from the inner walls of member 1, which are made with a dull finish so as to diffuse the light. The amount of such illumination decreases as the opening between the parts 14 and 15 is made smaller, and the extent to which the said opening must be contracted, as measured by reading of scale 25 with relation to index 24, to render the illumination at the eye-piece invisible to the normal human eye, is therefore an indication of the brightness of the scene to be photographed, or rather of its actinic power, the screen 2 permitting only actinic rays to pass. In order that this reading should be reliable, it is necessary to provide against variation in sensitiveness of the eye, either by dilatation of the pupil, or by fatigue of the retina. On observation of a feebly illuminated surface, there is an involuntary dilatation of the pupil, tending to make the eye more sensitive, and I prefer to make the eye-piece opening 9 so small that such dilatation will not materially increase the amount of light passing to the eye. On the other hand, prolonged observation of any object tends to produce fatigue of the eye, so that the observer's judgment of the illumination will depend on the time it takes him to make the measurement. My invention avoids this uncertainty by providing for shutting off the light at any time, without disturbing the adjustment of the light regulating means, so that the regulated illumination may be compared with a condition of no illumination, repeatedly and in rapid alternation, thus giving a more accurate judgment of the setting for disappearance of the illumination. This is effected by sliding the combined member, consisting of the parts 14 and 15, back and forth in the bore of member 1, so that the full diameter portions of said parts 14 and 15 come opposite opening 9, alternatively with the opening between said parts. It is possible, by a concurrent twisting and sliding movement of the parts 14 and 15, to make the regulating and shut off motions at the same time, so that the operation is rapid as well as accurate. Opening 8 is made so small that the light passing therethrough does not materially interfere with the result, in determining the actinic power of the illumination at opening 9; the purpose of the opening 8 being to enable the observer to view the scene directly, so that the device can be used as a view finder, or as a means for estimating the scenic value of the subject, with regard to actinic contrasts. The opening 8 may, however, be omitted or plugged, if desired.

Figs. 5 to 9 show an embodiment of my invention in which provision is made for direct vision of a translucent light-diffusing surface, but the regulating movement is effected by a continuation of the movement for momentarily shutting off the light. In this case the device may comprise an eye-piece 30 and an objective member 31 mounted to turn with respect to member 30. A fixed diaphragm 32 mounted in the eye-piece is provided with openings 33 and 34, and with a color screen 35 covering both of said openings and with a translucent screen 36 covering only the opening 34. Objective member 31 is provided with an adjustable diaphragm 38 having an annular flange 39 screwing on the outside of member 31 and partially split at 39' so as to frictionally engage the member 31. Annular flange 39 is externally threaded to screw into a threaded portion 30' of member 30, with sufficient looseness to enable free turning of member 39 in member 30. Diaphragm 32 may also be secured in place by screwing in the threaded portion 30'. Said diaphragm 32 is provided with a pin 41 engaging in a segmental slot 42 in diaphragm 38. Member 31 also has a segmental recess 49 adapted to engage pin 41 to limit the rotation thereof. Diaphragm 38 is provided with openings 44 and 45, adapted to register simultaneously with the respective openings 46 and 47 in member 31, and another opening 48 may be provided in diaphragm 38 for registration with opening 47, in using the device as a view finder. Members 31 and 39 are provided with scale means 50 and 51. In using this form of the invention, the light is tested by observation of the illumination of screen 36 at the eyepiece. Assuming that the apparatus has been so arranged that when the pin 41 engages the end of slot 42 as shown in Fig. 8, openings 34, 44, and 46 are in complete register, thus giving maximum illumination, member 31 is first rotated to the left, in Fig. 6. The diaphragm 38 is held stationary by engagement of pin 41 against end of slot 42 as shown, and the opening 46 is thus moved past opening 44, decreasing the size of the aperture until the light just disappears. Member 31 is then rotated to the right, in Fig. 6, and by friction also rotates member 38, the slot 42 moving past pin 41 until the other end of said slot engages said pin. The apertures are so positioned that at this time openings 45 and 47 will register to the same extent as did openings 44 and 46 previous to this last movement, and the aperture formed by openings 45 and 47 will also register with opening 34. Upon further rotation of member 31 in this direction, member 38 is held stationary and opening 47 is moved into greater register with opening 45 until the light reappears. By continuing these alternate rotations, a relative position of members 31 and 38 may be found at which the illumination just disappears. It is possible to determine this with especial accuracy by reason of the fact that when members 31 and 38 are being rotated together from one position of engagement of pin 41 against slot 42 to the other, no light whatever is transmitted to opening 34, and this condition of absolute darkness rests the eye and better enables the observer to detect the reappearance of light on again bringing the openings into register. When members 31 and 38 are in this relative position, the required exposure is indicated on scale 51. To use this device as a view finder, member 31 is rotated to the left in Fig. 6 until opening 47 is brought into register with openings 48 and 33, giving an unobstructed view through said openings.

What I claim is:

1. An actinometer comprising a translucent member, an eye-piece for observation thereof, objective aperture means, adjustable means for controlling the illumination of said translucent member from said aperture means, said adjustable means being provided with means for indicating its position of adjustment, and means for shutting off light from said translucent member without affecting the adjustment of said adjustable means.

2. An actinometer comprising objective aperture means, a translucent member adapted to be illuminated from said aperture means, adjustable means for controlling the illumination of said translucent means from said aperture means, and provided with means for indicating its position of adjustment, an eye-piece adapted to receive light transmitted through said translucent means, and means for shutting off light from said eye-piece without affecting the adjustment of said adjustable means.

3. An actinometer comprising objective aperture means, an eye-piece provided with a translucent screen, and light intercepting means slidably mounted between said aperture means and screen, and provided with relatively rotatable parts forming an adjustable opening, whereby the illumination of said screen may be varied by rotative adjustment of said parts, and the light may be shut off without affecting such adjustment, by sliding movement of said light intercepting means.

4. An actinometer comprising objective means provided with an aperture, an eye-piece provided with light diffusing means adapted for illumination from said aperture, and light intercepting means mounted between said aperture and said light diffusing means and provided with relatively adjustable parts forming an adjustable opening, said light intercepting means being movable to bring a light intercepting portion, or said adjustable opening, alternatively into position between the objective aperture and the light diffusing means.

5. In an actinometer, a member having an aperture, an eyepiece provided with a translucent screen, and light intercepting means slidably mounted between said aperture and screen and comprising two members each adapted to shut off the aperture from the screen, said members being relatively rotatable and having a screw engagement, whereby the opening between said members may be adjusted by rotation thereof, to provide for variation of the illumination of said screen through said opening, and said members being provided with scale means for indicating the size of such opening.

6. An actinometer comprising objective aperture means, eye-piece aperture means, light diffusing means adapted for illumination from the objective aperture and for observation from the eye-piece aperture, means for adjustably controlling the amount of light passing from the objective aperture to the light diffusing means, and means for shutting off the light from the diffusing means without changing the adjustment of said controlling means.

In testimony whereof I have hereunto set my hand, at Detroit, Michigan, this 8th day of February, 1916.

ALFRED C. STEWART.

Witnesses:
J. S. MURRAY,
ADELAIDE T. ADAMS.

Copies of this patent may be obtained for five cents each, by addressing the "Commissioner of Patents, Washington, D. C."